(12) United States Patent
Takenaka et al.

(10) Patent No.: US 8,225,891 B2
(45) Date of Patent: Jul. 24, 2012

(54) INVERTED PENDULUM MOBILE VEHICLE

(75) Inventors: Toru Takenaka, Saitama (JP); Makoto Hirano, Saitama (JP); Hideharu Izumi, Saitama (JP); Kazuya Kuwabara, Saitama (JP); Taiji Koyama, Saitama (JP); Shinichiro Kobashi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 421 days.

(21) Appl. No.: 12/454,394

(22) Filed: May 18, 2009

(65) Prior Publication Data

US 2009/0288900 A1 Nov. 26, 2009

(30) Foreign Application Priority Data

May 23, 2008 (JP) ................................ 2008-135502

(51) Int. Cl.
*B62D 61/00* (2006.01)
(52) U.S. Cl. .......................................... 180/7.1
(58) Field of Classification Search .................. 180/218, 180/24.03
See application file for complete search history.

(56) References Cited

U.S. PATENT DOCUMENTS

| | | | | |
|---|---|---|---|---|
| 3,842,777 A * | 10/1974 | Larsh ............................. | 114/126 |
| 5,975,225 A * | 11/1999 | Kamen et al. .................. | 180/7.1 |
| 6,367,817 B1 * | 4/2002 | Kamen et al. .............. | 280/5.507 |
| 7,303,032 B2 * | 12/2007 | Kahlert et al. ............... | 180/65.1 |
| 7,690,452 B2 * | 4/2010 | Kamen et al. ................ | 180/65.1 |
| 2006/0260857 A1 | 11/2006 | Kakinuma et al. | |
| 2009/0105908 A1 * | 4/2009 | Casey et al. ..................... | 701/41 |
| 2010/0017069 A1 | 1/2010 | Miki et al. | |

FOREIGN PATENT DOCUMENTS

| | | |
|---|---|---|
| JP | 2006-131115 A | 5/2006 |
| WO | 2007/077690 A1 | 7/2007 |

* cited by examiner

*Primary Examiner* — Tony Winner
(74) *Attorney, Agent, or Firm* — Carrier Blackman & Associates, P.C.; Joseph P. Carrier; William D. Blackman

(57) ABSTRACT

Provided is an inverted pendulum mobile vehicle such as a single-passenger coaxial two-wheel vehicle which is capable of turning with a small turning radius without causing discomfort to a rider or a vehicle occupant or causing a cargo or the like on the vehicle from shifting or falling off from the vehicle. The vehicle comprises a wheel supporting frame (12), a body frame (12) supported by the wheel supporting frame so as to be rotatable around a vertical axial line and carry a rider and or a cargo and a body coupler (52, 78, 70) that couples the body frame relative to the wheel supporting frame in a prescribed dynamic positional relationship. Thereby, even when the wheel supporting frame undergoes a rapid yaw movement either while traveling in a fore-and-aft direction or remaining stationary, the body frame that carries a vehicle occupant or a cargo is allowed to follow the yaw movement of the wheel supporting frame at a slower angular speed and/or acceleration/deceleration so that the vehicle occupant is prevented from experiencing discomfort and the cargo is prevented from shifting on the body frame or falling off from the vehicle.

9 Claims, 7 Drawing Sheets

INVERTED PENDULUM MOBILE VEHICLE

TECHNICAL FIELD

The present invention relates to an inverted pendulum mobile vehicle, and in particular to an inverted pendulum mobile vehicle such as a single-passenger coaxial two-wheel vehicle which is capable of turning with a small turning radius.

BACKGROUND OF THE INVENTION

In a known single-passenger inverted pendulum mobile vehicle, a pair of drive wheels are provided on a same axial line so as to be actuated individually by separate electric motors, and the vehicle is enabled to travel while standing upright under an inverted pendulum control process (See Japanese patent laid open publication No. 2006-131115, for instance)

Such a coaxial two-wheel vehicle can turn as required by causing a difference between the rotational speeds of the two wheels, and can even turn around a fixed yaw axis by rotating the two wheels in mutually opposite directions at a same rotational speed.

However, according to such a two-wheel vehicle, because the rider stands on a platform which is integral with the vehicle frame rotatably supporting the wheels, the rider moves jointly with the vehicle frame and therefore experiences a yaw acceleration as the vehicle makes a turn. Typically, such a vehicle is capable of turning very quickly, the rider may experience some discomfort owing to rapid changes in the direction of the movement of the vehicle. When the vehicle carries a cargo, owing to a strong centrifugal force that may be applied to the cargo, there is a danger of the cargo to fall off or to shift from a prescribed position on the vehicle frame.

BRIEF SUMMARY OF THE INVENTION

In view of such problems of the prior art, a primary object of the present invention is to provide an inverted pendulum mobile vehicle such as a single-passenger coaxial two-wheel vehicle which is capable of turning with a small turning radius without causing discomfort to a rider or a vehicle occupant or causing a cargo or the like on the vehicle from shifting or falling off from the vehicle.

A second object of the present invention is to provide such a vehicle without requiring a substantial increase in the cost and/or increasing the complexity of the control structure therefor.

According to the present invention, such an object can be accomplished at least partly by providing a mobile vehicle including at least one drive wheel and configured to be able to travel according to a principle of an inverted pendulum, comprising: a wheel supporting frame rotatably supporting the drive wheel; a drive actuator for actuating the drive wheel so as to cause the vehicle to travel in a fore-and-aft direction and to turn vehicle around a vertical axial line; a body frame supported by the wheel supporting frame so as to be rotatable around a vertical axial line and carry a rider and or a cargo; and a body coupler that couples the body frame relative to the wheel supporting frame in a prescribed dynamic positional relationship.

Thereby, even when the wheel supporting frame undergoes a rapid yaw movement either while traveling in a fore-and-aft direction or remaining stationary, the body frame that carries a vehicle occupant or a cargo is allowed to follow the yaw movement of the wheel supporting frame at a slower angular speed and/or acceleration/deceleration so that the vehicle occupant is prevented from experiencing discomfort and the cargo is prevented from shifting on the body frame or falling off from the vehicle. Typically, the vehicle has a vertically elongated dimension, and travels in an upright orientation so that the vehicle is enabled to travel freely in a limited space, and make highly tight turns.

If the body coupler comprises a yaw actuator that rotatively actuates the body frame relative to the wheel supporting frame, at least one sensor for detecting a dynamic state of the vehicle and a control device that provides a command signal for the yaw actuator according an output of the at least one sensor, the movement of the body frame can be controlled as desired, and the yaw movement of the body frame can be controlled in relation to the wheel supporting frame at will, and an optimum performance can be achieved.

Typically, the sensor detects a state of the actuator for actuating the drive wheel, and the control device provides a command signal for the yaw actuator so as to cause the body frame to follow a yaw movement of the wheel supporting member in a controlled manner. Thereby, the need for sensors and other control arrangements can be minimized.

According to a simplified embodiment of the present invention, the body coupler comprises a torsionally resilient member interposed between the body frame and wheel supporting frame.

The body coupler may further comprise a torsional damper interposed between the body frame and wheel supporting frame.

According to a preferred embodiment of the present invention, the vehicle comprises a pair of drive wheels which are coaxially disposed relative to each other so as to be rotated in an independent manner, and a pair of drive actuators that are configured to actuate the corresponding drive wheels individually.

In such a case, the body frame may comprise a pair of steps disposed on either side thereof to support corresponding feet of a rider and a pair of load sensors for detecting loads exerted on the steps by the corresponding feet of the rider, and the vehicle may further comprise a control device that causes the drive actuators to actuate the drive wheels in such a way that the vehicle makes a turn to a side of one of the steps on which a greater load is applied than the other.

Alternatively, the vehicle may further comprise a roll angle sensor mounted on the body frame and a control device that causes the drive actuators to actuate the drive wheels in such a way that the vehicle turns to a side toward which a roll angle of the body frame is detected by the roll angle sensor.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
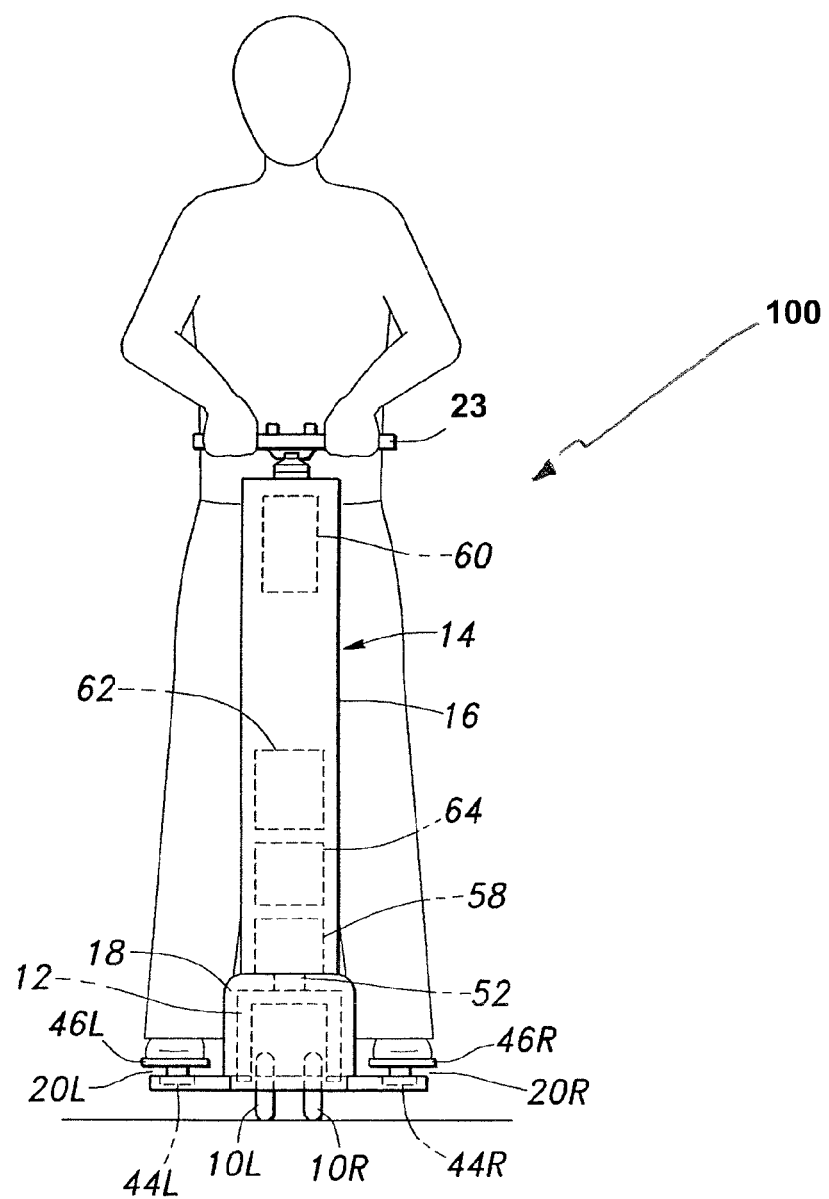
FIG. 1 is a front view of a co-axial two-wheel vehicle embodying the present invention.

Referring to FIG. 1, a co-axial two-wheel vehicle 100 embodying the present invention comprise a pair of drive wheels 10L and 10R disposed coaxially on a same axial line one next to the other, a wheel supporting frame 12 rotatably supporting the drive wheels 10 and a body frame 14 extending upright from the wheel supporting frame 12.

The body frame 14 comprises a vertically extending cylindrical column 16, a skirt 18 formed in a lower part of the column 16 and covering the wheel supporting frame 12, a pair of steps 20L and 20R extending laterally from either side of the skirt 18 to enable a rider to stand thereon and a grip bar 23 fixedly attached to the upper end of the column 16 and extending laterally so as to be held by the rider. The grip bar 23 extends horizontally toward either side in the same direction as the steps 20L and 20R extend. The wheel supporting frame 12 and body frame 14 jointly form a vehicle frame.

The column 16 is incorporated with a roll angle sensor 62 and a pitch angle sensor 64 which may consist of gyro sensors, for instance. The roll angle sensor 62 detects the roll angle or lateral tilting of the body frame 14, and the pitch angle or fore-and-aft tilting of the body frame 14.

Figure 2:
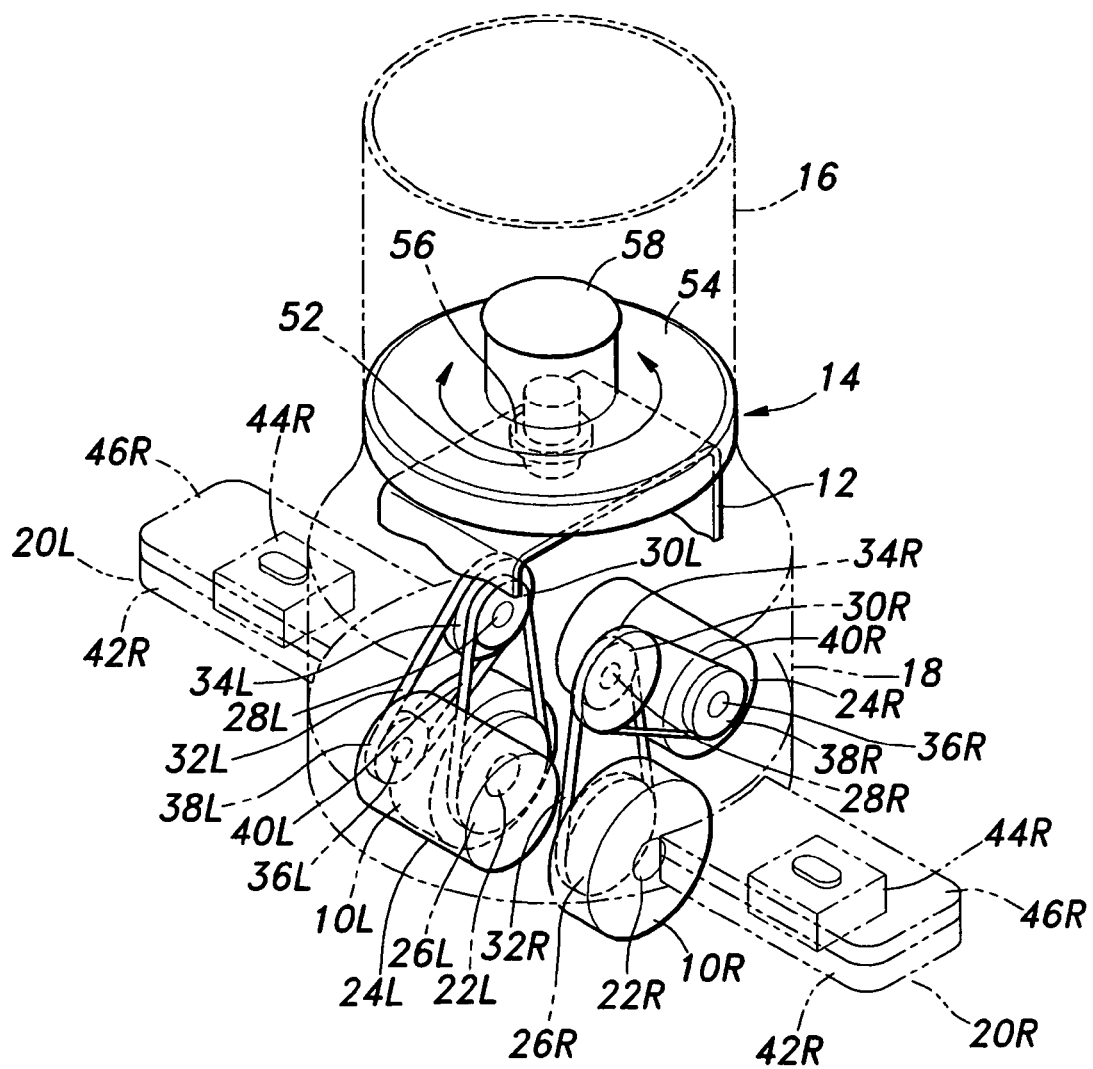
FIG. 2 is a see-through perspective view of an essential part of the vehicle illustrated in FIG. 1.

As shown in FIG. 2, each step 20 comprises a step support member 42 extending in a corresponding direction, a foot load sensor 44 consisting of a six-axis load cell, for instance, attached to the upper surface of the corresponding step support member 42 and a step plate 46 mounted on the upper surface of the foot load sensor 44. In FIG. 2, these components are denoted with numerals accompanied by letters R and L which indicate the corresponding parts are located on the right hand side and left hand side, respectively.

The drive wheels 10L and 10R are supported by the wheel supporting frame 12 via corresponding axle shafts 22L and 22R extending horizontally and coaxially to each other so that the two wheels may be spaced apart from each other by a prescribed distance and individually rotatable around a common center line of rotation. The wheel supporting frame 12 is additionally incorporated with electric motors 24L and 24R configured to drive the corresponding wheels 10L and 10R, respectively, in a mutually independent manner.

Each drive wheel 10 is fitted with a coaxial pulley 26. An intermediate shaft 28 is rotatably supported by the wheel supporting frame 12 above each drive wheel 10 so as to be rotatable around an axial line in parallel with the rotational center line of the drive wheel 10, and is coaxially fitted with a pair of pulleys 30 and 34. An electric motor 24 is fixedly supported by the wheel supporting frame 12 adjacent to each drive wheel 10, and has an output shaft 36 fitted with a pulley 38. A first endless belt 32 is passed around the pulley 38 on the output shaft 36 of each electric motor 24 and one of the pulleys 34 on the corresponding intermediate shaft 28. A second endless belt 40 is passed around the other pulley 30 on the intermediate shaft 28 and the pulley 26 on the corresponding drive wheel 10. The numerals for various components illustrated in FIG. 2 are accompanied by letters L and R to indicate on which side of the vehicle the corresponding components are located. Thus, the two wheels 10 can be actuated, in terms of both speed and rotational direction, individually or independently from each other.

Thus, when the two wheels are rotated in a same direction at a same rotational speed, the wheel supporting frame 12 travels straight ahead or back, depending on the direction of the rotation. When the two wheels are rotated at different rotational speeds, the wheel supporting frame 12 turns in a corresponding direction or undergoes a yaw movement as it travels. When the two wheels are rotated at a same sped but in mutually different direction, the wheel supporting frame 12 turns around a fixed yaw axis extending vertically through a middle point of the two wheels.

It should be noted that the body frame 14 is mounted on the wheel supporting frame 12 so as to be rotatable around a vertical axial line (yaw axis) via a vertical shaft 52. In other words, the body frame 14 is connected to the wheel supporting frame 12 so as to be rotatable around a vertical axial line (yaw axis) via the vertical shaft 52.

The vertical shaft 52 extends vertically and centrally from an upper part of the wheel supporting frame 12. A lower part of the body frame 14 located between the column 16 and skirt 18 is provided with a support member 54 essentially consisting of a horizontal disk member which is integrally attached to the skirt 18. The support member 54 is centrally provided with a bearing portion 56 that receives the vertical shaft 52 in a mutually rotatable manner with respect to a vertical center line of the vertical shaft 52, and a yaw actuator 58 essentially consisting of an electric motor fitted with a brake so that the body frame 14 can be rotated with respect to the wheel supporting frame 12 as desired around the vertical axial line.

The mode of operation of the illustrated embodiment is described in the following. A rider places his feet upon the corresponding steps 46 and holds the two ends of the grip bar 23. The drive wheels 20 are actuated so that the vehicle 100 stands still in an upright orientation according to the principle of the inverted pendulum vehicle. When the rider desires to travel ahead, he leans forward, causing the gravitational center of the rider to be shifted forward. Conversely, when the rider desires to travel backward, he leans back, causing the gravitational center of the rider to be shifted backward. Likewise, when the rider desires to make a turn, he leans laterally in the desired direction, and this causes the vehicle to turn in the desired direction.

Figure 3:
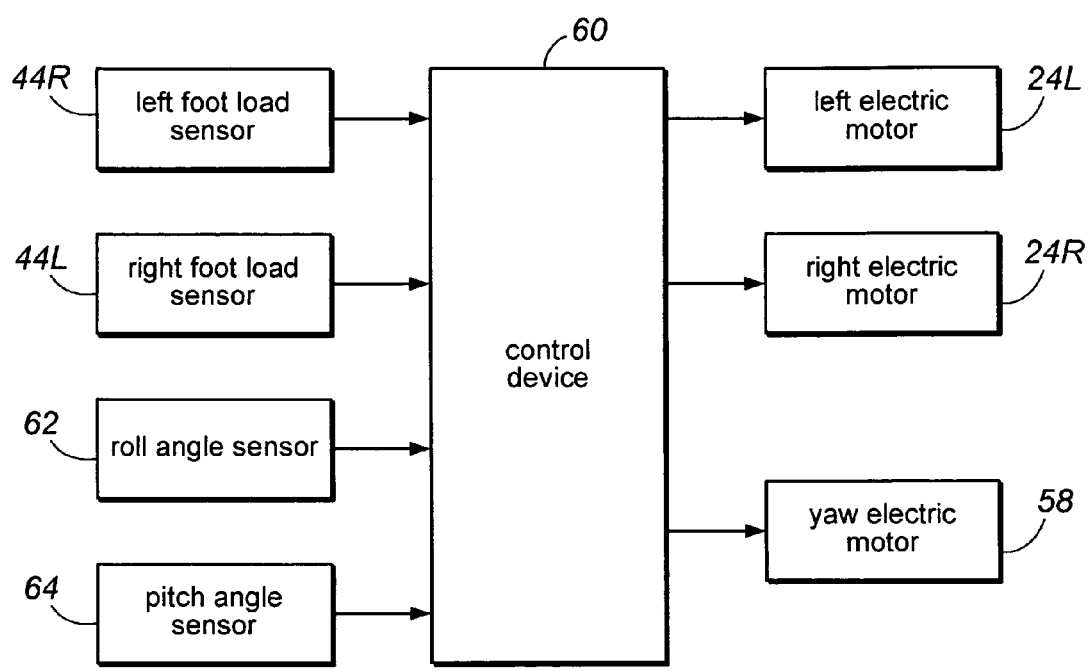
FIG. 3 is a block diagram of the control arrangement for the co-axial two-wheel vehicle.

The control system for this vehicle 100 is described in the following. Referring to FIG. 3, the control system comprises a control device 60 which essentially consists of a microcomputer. The control device 60 receives information on the roll angle of the body frame 14 from the roll angle sensor 62 and the pitch angle of the body frame 14 from the pitch angle sensor 64, and controls the drive wheels 10 according to the principle of the inverted pendulum so as to cause the vehicle to move about while maintaining an upright orientation in a stable manner. Alternatively or additionally, the control device 60 may further receive output signals from the left foot load sensor 44L and the right foot load sensor 44R so that the shifting of the gravitational center of the rider may be detected, and individually controls the electric motors 24 and 58 that actuate the left wheel electric motor 24L, right wheel electric motor 24R and yaw electric motor 58 individually.

Based upon the control processes outlined in the following, the vehicle 100 can travel ahead or backward, and turn to the right or left as required.

(1) When the loads acting on the right and left foot load sensors 44L and 44R are equal to each other, the electric motors 44L and 44R for actuating the corresponding drive wheels 10L and 10R are actuated in a same forward direction at a speed corresponding to the shift of the gravitation center of the rider in the forward direction as detected by the right and left foot load sensors 44L and 44R. Thereby, the vehicle 100 travels forward. Also, the greater the forward shift of the gravitational center is, the greater the speed of the forward travel of the vehicle is.

(2) When the loads acting on the right and left foot load sensors 44L and 44R are equal to each other, the electric motors 44L and 44R for actuating the corresponding drive wheels 10L and 10R are actuated in a same backward direction at a speed corresponding to the shift of the gravitation center of the rider in the backward direction as detected by the right and left foot load sensors 44L and 44R. Thereby, the vehicle 100 travels backward or rearward. Also, the greater the backward shift of the gravitational center is, the greater the speed of the backward travel of the vehicle is. The maximum speed of the backward travel of the vehicle is substantially lower than that of the forward travel of the vehicle.

(3) When the vehicle is traveling straight ahead, and load acting on the left foot load sensor 44L is increased in relation to that acting on the right foot load sensor 44R (it can be accomplished, for instance, by the rider leaning to the left), the electric motor 42R for actuating the right drive wheel 10R is actuated at a correspondingly higher speed in the forward direction than the electric motor 42L for actuating the left drive wheel 10L. Thereby, the vehicle 100 or the wheel supporting frame 12 makes a leftward turn while the vehicle 100 travels in forward direction.

(4) When the vehicle is traveling straight backward, and load acting on the left foot load sensor 44L is increased in relation to that acting on the right foot load sensor 44R (it can be accomplished, for instance, by the rider leaning to the left), the electric motor 42R for actuating the right drive wheel 10R is actuated at a correspondingly higher speed in the backward direction than the electric motor 42L for actuating the left drive wheel 10L. Thereby, the vehicle 100 or the wheel supporting frame 12 makes a leftward turn while the vehicle 100 travels in backward direction.

(5) When the vehicle is traveling straight ahead, and load acting on the right foot load sensor 44R is increased in relation to that acting on the left foot load sensor 44L (it can be accomplished, for instance, by the rider leaning to the right), the electric motor 42L for actuating the left drive wheel 10L is actuated at a correspondingly higher speed in the forward direction than the electric motor 42R for actuating the right drive wheel 10R. Thereby, the vehicle 100 or the wheel supporting frame 12 makes a rightward turn while the vehicle 100 travels in forward direction.

(6) When the vehicle is traveling straight backward, and load acting on the right foot load sensor 44R is increased than that acting on the left foot load sensor 44L (it can be accomplished, for instance, by the rider leaning to the right), the electric motor 42L for actuating the left drive wheel 10L is actuated at a correspondingly higher speed in the backward direction than the electric motor 42R for actuating the right drive wheel 10R. Thereby, the vehicle 100 or the wheel supporting frame 12 makes a rightward turn while the vehicle 100 travels in backward direction.

In the foregoing description, the foot load sensors 44 were used for determining the traveling direction of the vehicle, but it is also possible to use the roll angle sensor 62 and pitch angle sensor 64, either additionally or alternatively, for determining the traveling direction of the vehicle.

When the vehicle 100 is making a turn such as in cases (3) to (6) above, the greater the difference in the rotational speeds of the two electric motors 24 is, the smaller the turning radius of the vehicle is, and the greater the yaw rate of the vehicle is. When one of the wheels is kept stationary while the other wheel is rotated in either direction, the vehicle turns around the stationary wheel, and the distance between the two wheels is given as the turning radius. When the two wheels are rotated at a same speed in opposite directions, the vehicle turns around a middle point between the two wheels, and one half of the distance between the two wheels is given as the turning radius.

When the vehicle is traveling either straight ahead or straight backward such as in cases (1) and (2), the body frame 14 and wheel supporting frame 12 are kept fixed or rotational fast to each other, for instance by applying brake to the yaw electric motor 58, so that the grip bar 22 is kept in parallel with the central axial line of the two drive wheels 10. In other words, there is no relative rotation between the body frame 14 and wheel supporting frame 12 in this case.

On the other hand, when the vehicle is making a turn such as in cases (3) to (6), as soon as a turning movement is initiated, the brake on the yaw electric motor 58 is disengaged, the control device computes the yaw angle and yaw rate of the vehicle, and actuates the yaw electric motor 58 to turn the body frame relative to the wheel supporting frame so as to achieve the same yaw angle as the wheel supporting frame at a yaw rate lower than that of the wheel supporting frame or with a certain time delay with respect to the yaw movement of the wheel supporting frame.

In other words, as the wheel supporting frame 12 make a turn, the body frame 14 follows the turning or yaw movement of the wheel supporting frame at a lower yaw rate or with a certain time delay, and is eventually oriented in the same direction as the wheel supporting frame. The yaw movement of the body frame can be effected in various ways, but it is preferred that the yaw acceleration of the body frame should be kept below a prescribed level so that the rider may not experience any discomfort. For the same reason, the yaw rate of the vehicle frame may be limited with respect to that of the wheel supporting frame. On the other hand, the response of the body frame is required to be fast enough for the maneuverability of the vehicle to be acceptable.

Figure 4:
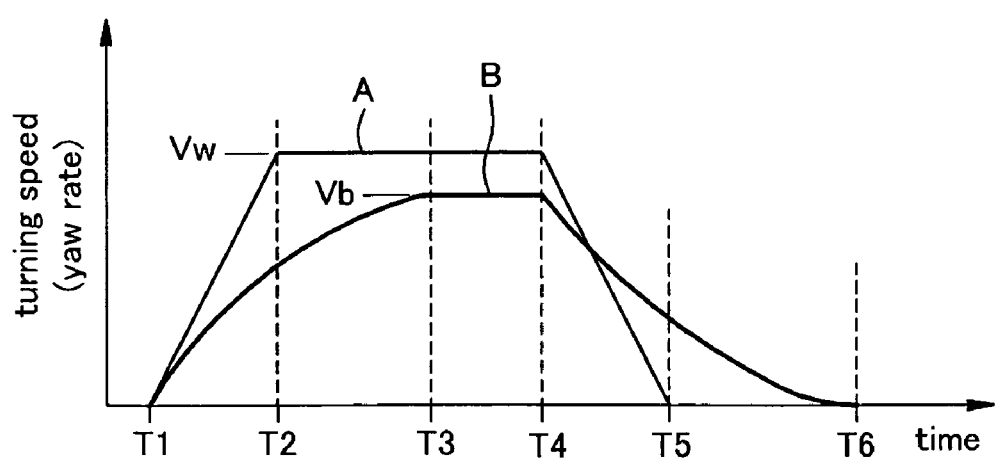
FIG. 4 is a diagram showing the time history of the yaw movement of the body frame following a given yaw movement of the wheel supporting frame.

FIG. 4 shows an exemplary property of the yaw movement of the body frame 14 relative to the yaw movement of the wheel supporting frame 12. In FIG. 4, letter A indicates the turning speed (yaw rate) of the wheel supporting frame 12, and letter B indicates the turning speed (yaw rate) of the body frame 14, with respect to the ground in each case. In this example, the turning movements of the both frames begin substantially at the same time at time T1. The angular acceleration of the body frame is smaller than that of the wheel supporting frame. The turning speed (yaw rate) of the wheel supporting frame then becomes constant (constant value Vw) at time T2, and the turning speed of the body frame reaches a constant value (Vb) (which is lower than value Vw) at time T3 (which is somewhat later than time T2).

The deceleration of the yaw movements of the wheel supporting frame and body frame occurs substantially at the same time at T4. During this deceleration process, the deceleration of the body frame is smaller than that of the wheel supporting frame. Thereafter, the turning movement of the wheel supporting frame 12 ends at time T5, and the turning movement of the body frame 14 ends at time T6 which is later than time T5.

The wheel supporting frame 12 and body frame 14 were initially oriented in the same direction at time T1, and the turning of the body frame 14 follows the turning of the wheel supporting frame 12 with some time delay until they become oriented in the same direction once again at time T6. The body frame 14 thus turns at a lower angular speed and/or a lower acceleration/deceleration than the wheel supporting frame 12 during the turning maneuver of the vehicle.

Thus, the rider is prevented from being abruptly turned during a rapid turning maneuver, and can avoid discomfort. When a cargo is carried by the body frame or hung from the hand grip, such cargo is prevented from being excessively shifted or swung during a rapid turning maneuver, and this also contributes to the riding comfort of the vehicle.

The turning angle and turning speed of the yaw axis motor 58 were computed by the control device 60 according to the command signals for the electric motors for the right and left wheels in the illustrated embodiment. The signals may be obtained either from rotary encoders or the like incorporated in the electric motors or drive wheels, or from motor controllers that provide drive signals for the electric motors which typically consist of brushless motors. However, it is also possible to detect the yaw movement of the wheel supporting frame 12 by using a gyro sensor or the like, and use the thus detected yaw movement for the control of the yaw axis electric motor.

FIG. 3 illustrates a block diagram of such an embodiment. The system comprises a roll angle sensor 62 and a pitch angle sensor 64 consisting of gyro sensors or the like that are attached to suitable parts of the body frame 14. Thereby, the control device 60 can control the electric motors 24 for actuating the drive wheels in such a manner that the turning control of the vehicle is conducted according to the roll angle of the body frame 14 as detected by the roll angle sensor 62, and the forward/backward movement control of the vehicle is conducted according to the pitch angle of the body frame 14 as detected by the pitch angle sensor 64. Typically, the vehicle makes a turn in the direction toward which the vehicle leans.

Figure 5:
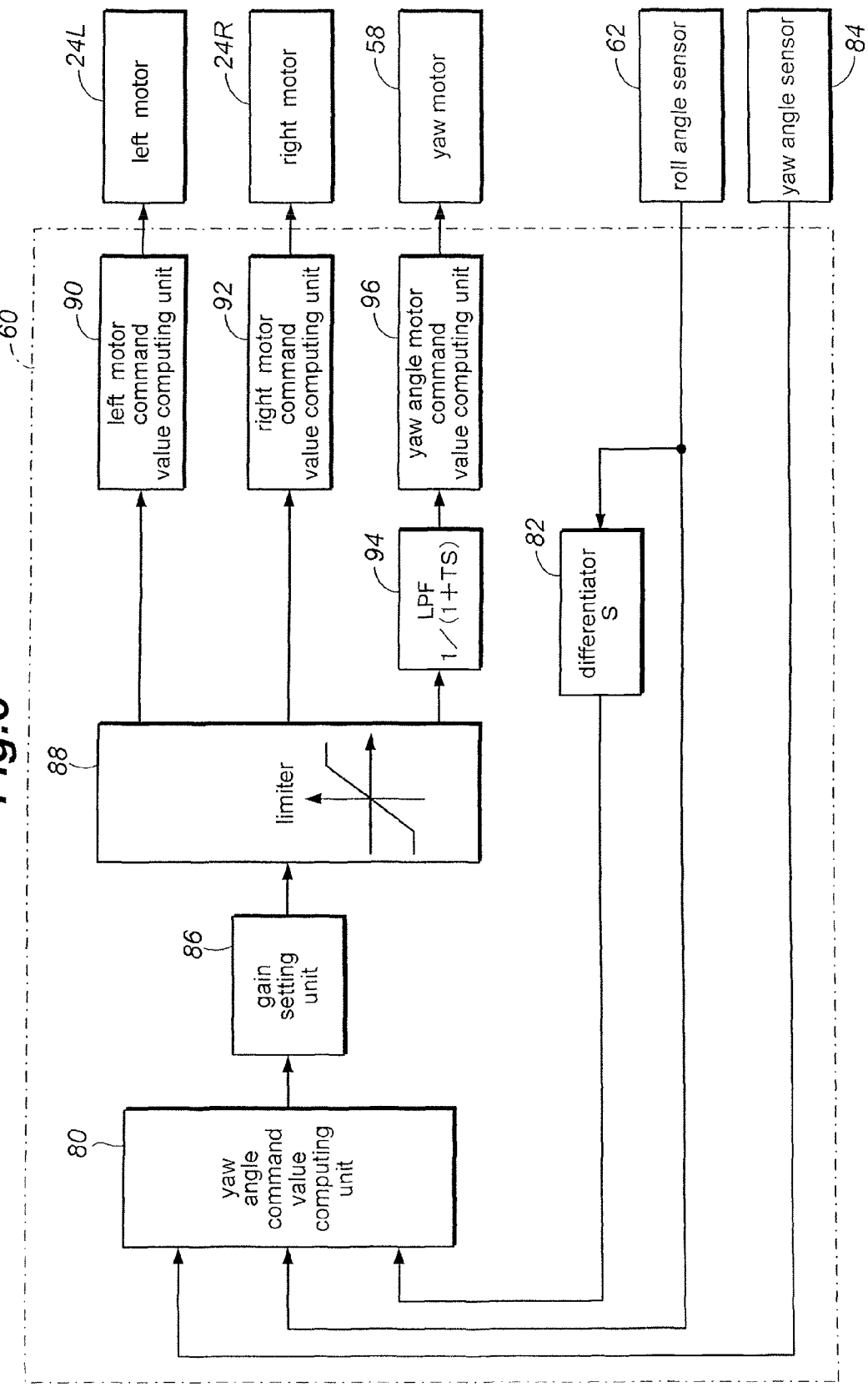
FIG. 5 is a block diagram of an alternate control arrangement for the co-axial two-wheel vehicle.

The part of the control device 60 responsible for the turning maneuver of the vehicle is described in greater detail with reference to FIG. 5. The system further comprises a yaw angle sensor 84 attached to the wheel supporting frame 12 and a differentiator 82 that differentiates the output from the roll angle sensor 62. The control device 60 comprises a yaw angle command value computing unit 80 that receive inputs from the roll angle sensor 62, yaw angle sensor 84 and differentiator 82 that provides a yaw rate of the wheel supporting frame 12. The yaw angle command value computing unit 80 computes a yaw angle command value according to the inputs thereto.

An upper and a lower limit are set by a limiter 88 for the yaw angle command value provided by the yaw angle command unit 80. The output of the limiter 88 is forwarded to a left wheel motor command value computing unit 90 and a right wheel motor command value computing unit 92. The left wheel motor command value computing unit 90 computes a left wheel motor command value, and the right wheel motor command value computing unit 92 computes a right wheel motor command value, both according to the received yaw angle command value.

The electric motors 24L and 24R for the left and right drive wheels are actuated according to the command signals received from the left wheel motor command value computing unit 90 and right wheel motor command value computing unit 92, respectively. Thereby, the wheel supporting frame 12 can turn according to the roll angle of the body frame 14.

Additionally, the yaw angle command value computed by the yaw angle command value computing unit 80 is forwarded to a yaw angle electric motor command value computing unit 96 via a low pass filter 94, and the yaw angle electric motor command value computing unit 96 computes a yaw angel electric motor command value according to the yaw angle command value received from the low pass filter 94. The yaw angle electric motor 58 is actuated so as to turn the body frame 14 relative to the wheel supporting frame 12 according to the yaw angle electric motor command value provided by the yaw angle electric motor command value computing unit 96.

The low pass filter 94 may consist of a first order delay circuit that can be represented by a transfer function $1/(1+Ts)$ so that the yaw angle electric motor 58 may turn the body frame 14 with a time delay given by a prescribed time constant relative to the turning movement of the wheel supporting frame 12 caused by the corresponding actuation of the electric motors for actuating the right and left wheels. Thereby, the turning of the body frame can be accomplished in such a way as to avoid any undue discomfort to the rider and to provide a favorable ride quality without imposing any computational load on the control system.

Figure 6:
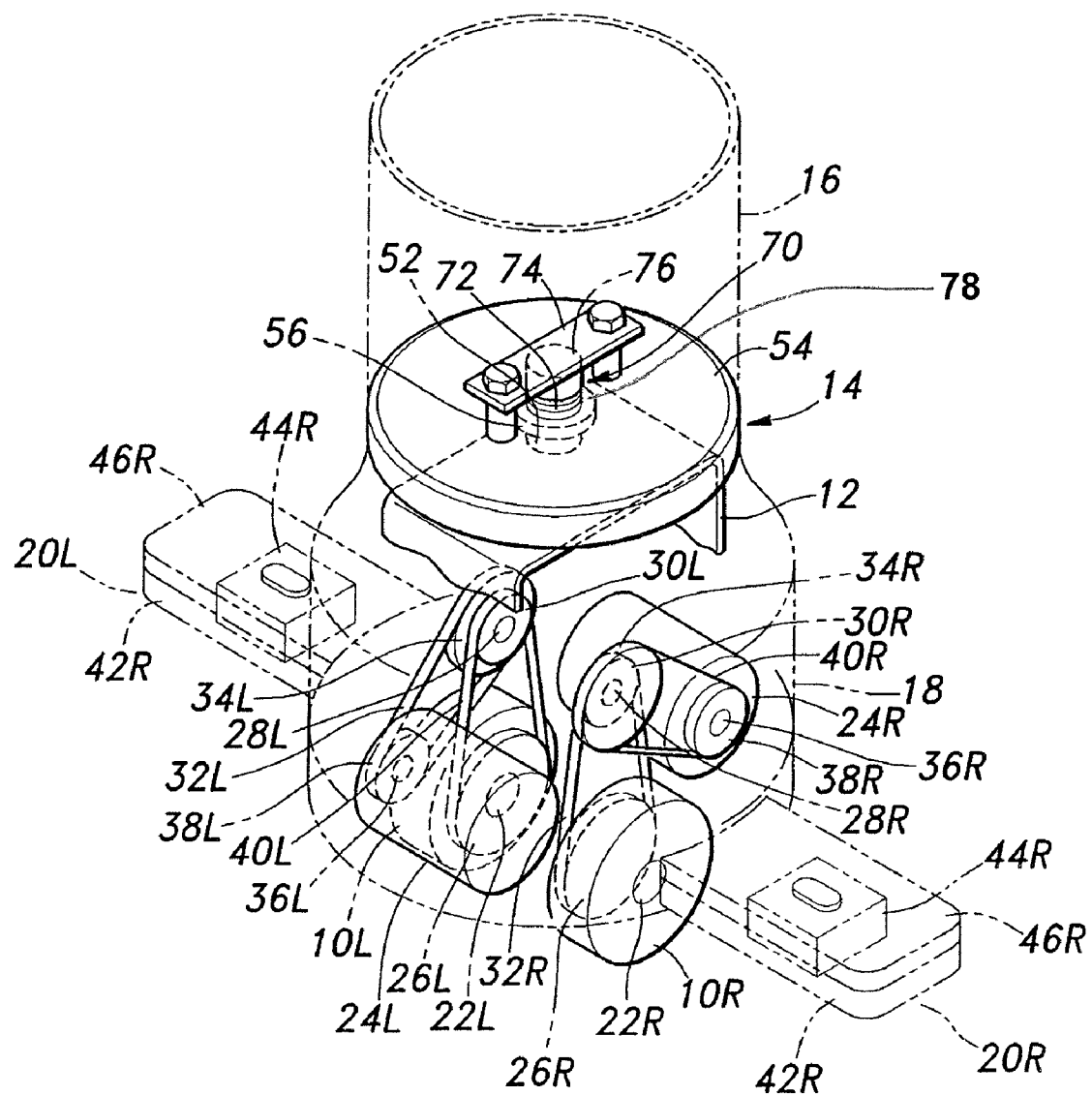
FIG. 6 is a view similar to FIG. 2 showing a second embodiment of the present invention.
Figure 7:
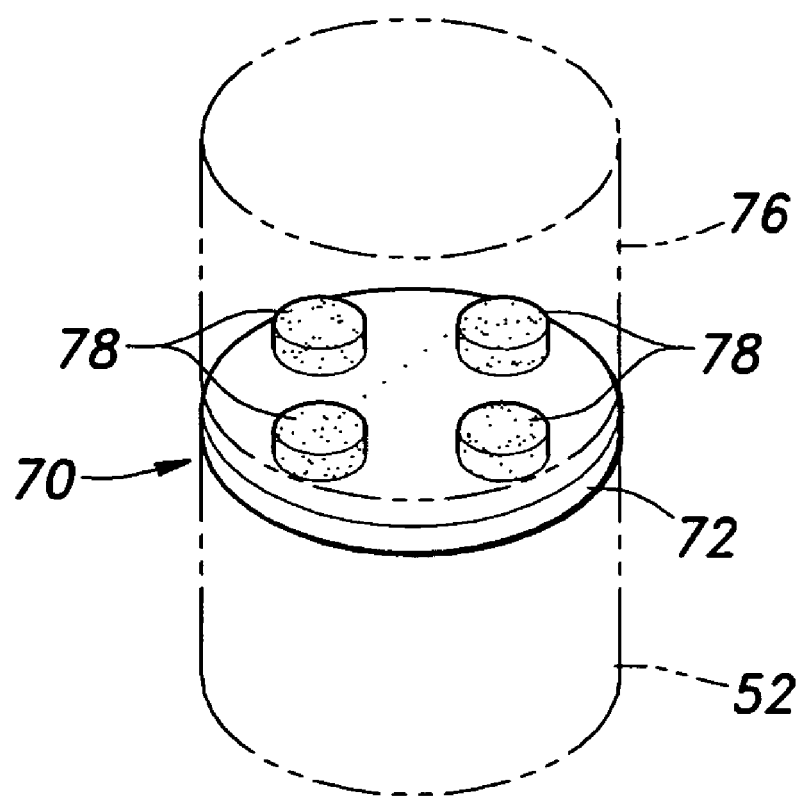
FIG. 7 is a simplified view of the torsion coupler used in the second embodiment of the present invention.

A second embodiment of the inverted pendulum mobile vehicle of the present invention is described in the following with reference to FIGS. 6 and 7 in which the parts corresponding to those of the previous embodiment are denoted with like numerals.

In this embodiment, the vertical shaft 52 supported by the wheel supporting frame 12 is connected to a support member 54 integral with the body frame 14 via a torsional coupling 70. The torsional coupling 70 includes a lower member 72 fixedly attached to the vertical shaft 52, an upper member 76 fixedly attached to the support member 54 via a mounting member 74 and elastic members 78 made of rubber or other elastomeric material that join the lower member 72 and upper member 76 to each other.

The elastic member 78 is thus interposed between the wheel supporting frame 12 and body frame 14 so as to resiliently urge the two frames toward the mutually aligned position when the two frames are twisted relative to each other away from the mutually aligned position.

Therefore, as the wheel supporting frame 12 turns, in particular at a rapid rate, the elastic member 78 undergoes a resilient twisting deformation. This causes the lower member 72 to be twisted relative to the upper member 76 causing the upper member 76 to be stationary immediately thereafter, and the upper member 76 is allowed to follow the yaw movement of the lower member 72 with a certain time delay. In other words, the upper member 76 following the yaw movement of the lower part at a relatively slow angular speed (in particular, when the elastic member 78 is given with a damping factor which produces a damping force substantially proportional to the relative angular speed between the upper and lower members), and eventually aligns with the lower member 72.

Thereby, the rider riding on the body frame 14 is prevented from being abruptly turned around a vertical axis, and this prevents the rider from experiencing discomfort. The torsional coupling 70 is not limited by the illustrated embodiment that uses elastic members made of rubber or the like such as shown in FIGS. 6-7, but may also consist of any other known arrangement including those using a torsional spring and an optional torsional damper.

Although the present invention has been described in terms of preferred embodiments thereof, it is obvious to a person skilled in the art that various alterations and modifications are possible without departing from the scope of the present invention which is set forth in the appended claims. For instance, the illustrated embodiments used a pair of coaxial drive wheels, but may also be other vehicles such as those disclosed in WO2008/139740, WO2008/132778 and WO2008/132779.

The contents of the original Japanese patent application on which the Paris Convention priority claim is made for the present application, as well as those of the prior art references mentioned in the present application, are incorporated in this application by reference.

The invention claimed is:

1. A mobile vehicle including at least one drive wheel and configured to be able to travel according to a principle of an inverted pendulum, comprising:
 a supporting frame rotatably supporting the at least one drive wheel;
 a first drive actuator and a second drive actuator for actuating the at least one drive wheel so as to cause the vehicle to travel in a fore-and-aft direction and to turn the vehicle around a vertical axial line;
 a body frame supported by the wheel supporting frame so as to be rotatable around a vertical axial line and carry a rider and or a cargo; and
 a body coupler that couples the body frame relative to the wheel supporting frame in a prescribed dynamic positional relationship whereby turning of the body frame follows turning of the wheel supporting frame with time delay.

2. The mobile vehicle according to claim 1, wherein the body coupler comprises a yaw actuator that rotatively actuates the body frame relative to the wheel supporting frame, at least one sensor for detecting a dynamic state involving turning of the vehicle and a control device that provides a command signal for the yaw actuator according an output of the at least one sensor.

3. The mobile vehicle according to claim 2, wherein the at least one sensor detects a state of the first and second drive actuators for actuating the at least one drive wheel, and the control device provides a command signal for the yaw actuator so as to cause the body frame to follow a yaw movement of the wheel supporting member in a controlled manner.

4. The mobile vehicle according to claim 1, wherein the body coupler comprises a torsionally resilient member interposed between the body frame and wheel supporting frame.

5. The mobile vehicle according to claim 1, wherein the body frame includes a column which extends upwardly to a grip bar disposed on an upper end of the column and which is adapted to be gripped by a person standing on the wheel supporting frame.

6. A mobile vehicle including a pair of drive wheels which are coaxially disposed relative to each other so as to be rotated in an independent manner, and the vehicle being configured to be able to travel according to a principle of an inverted pendulum, comprising:
 a supporting frame rotatably supporting the drive wheels;
 a pair of drive actuators that are configured to actuate the corresponding drive wheels individually so as to cause the vehicle to travel in a fore-and-aft direction and to turn the vehicle around a vertical axial line;
 a body frame supported by the wheel supporting frame so as to be rotatable around a vertical axial line and carry a rider and or a cargo; and
 a body coupler that couples the body frame relative to the wheel supporting frame in a prescribed dynamic positional relationship whereby turning of the body frame follows turning of the wheel supporting frame with time delay.

7. The mobile vehicle according to claim 6, wherein the body frame comprises a pair of steps disposed on either side thereof to support corresponding feet of a rider and a pair of load sensors for detecting loads exerted on the steps by the corresponding feet of the rider, and the vehicle further comprises a control device that causes the drive actuators to actuate the drive wheels in such a way that the vehicle makes a turn to a side of one of the steps on which a greater load is applied than the other.

8. The mobile vehicle according to claim 6, further comprising a roll angle sensor mounted on the body frame and a control device that causes the drive actuators to actuate the drive wheels in such a way that the vehicle makes turn to a side toward which a roll angle of the body frame is detected by the roll angle sensor.

9. The mobile vehicle according to claim 6, wherein the pair of drive wheels are centered beneath the body coupler.

* * * * *